United States Patent [19]

Föhl

[11] 4,449,443

[45] May 22, 1984

[54] CYLINDER/PISTON DRIVE, ESPECIALLY FOR RETIGHTENER SYSTEMS IN AUTOMATIC SAFETY BELT WINDING DEVICES

[75] Inventor: Artur Föhl, Schorndorf, Fed. Rep. of Germany

[73] Assignee: REPA Feinstanzwerk GmbH, Alfdorf, Fed. Rep. of Germany

[21] Appl. No.: 307,883

[22] Filed: Oct. 2, 1981

[30] Foreign Application Priority Data

Oct. 6, 1980 [DE] Fed. Rep. of Germany ....... 3037707
Sep. 18, 1981 [DE] Fed. Rep. of Germany ....... 3137263

[51] Int. Cl.$^3$ .......................... F15B 15/20; F01B 9/00

[52] U.S. Cl. .................................. 91/392; 92/117 A; 92/137; 60/636

[58] Field of Search ................. 92/137, 117 A, 117 R, 92/6 R, 6 D, 108, 208, 13.6; 91/392, 25, 26, 209, 208, 207, 519; 60/636, 632

[56] References Cited

U.S. PATENT DOCUMENTS

| | | | |
|---|---|---|---|
| 2,805,447 | 9/1957 | Voges | 91/209 |
| 3,093,117 | 6/1963 | Brown | 91/25 |
| 3,363,512 | 1/1968 | Ottestad | 91/392 |
| 4,121,840 | 10/1978 | Berg | 92/137 |

FOREIGN PATENT DOCUMENTS

| | | | |
|---|---|---|---|
| 2306354 | 10/1976 | France | 92/137 |

*Primary Examiner*—Paul E. Maslousky
*Attorney, Agent, or Firm*—Yount & Tarolli

[57] ABSTRACT

Cylinder/piston drive especially for re-tightening systems in automatic safety belt winding devices, with a cylinder in which a drive piston is movably guided, as well as with a pressure accumulator which can be connected to the interior of the cylinder. The drive piston 13 has in the region facing the connecting point of the pressure accumulator (cartridge 34) at least one reduced cross sectional pressure surface (annular 15, 27) and operates with a guide part (10,21) in the cylinder 1 conforming to the reduced cross sectional shape of the drive piston such that at the beginning of the pressure action, only part of the cross section of the piston is exposed to the pressure force.

5 Claims, 5 Drawing Figures

20
9
1
24
26
28
23
c
6
25
4
b
27
7
22
8
21
5
3
2
19

9
20
1
18
13
14
11
a
6
15
17
7
4
16
12
5
3
8
2
10
19

20
9
1
26
24
28
23
c
25
6
4
b
27
7
22
8
21
5
3
2
19

1
13
4
16
10
19
36
3
32
48
49
45
50
33
42
46
41
40
30
31
29

IV
IV
33
42
41
44
37
36
38
39
35
38
37
37
38
43
4
19
34
40
29

63
62
69
67
64
60
61
57
59
58
55
66
65
56
68

CYLINDER/PISTON DRIVE, ESPECIALLY FOR RETIGHTENER SYSTEMS IN AUTOMATIC SAFETY BELT WINDING DEVICES

CROSS-REFERENCE TO RELATED APPLICATION

My application Ser. No. 307,882, filed on Oct. 2, 1981.

BACKGROUND OF THE INVENTION

1. Field of the Invention

The invention relates to a cylinder/piston drive, especially for retightening systems in automatic safety belt winding devices, having a pressure accumulator which can be connected to the interior of the cylinder.

2. Description of the Prior Art

In cylinder/piston drives of the type mentioned above, especially in such drives for retightener systems in automatic safety belt winding devices, the retightening of the belt should take place in a very short time from the time of activation, occurring for instance in the event of a crash. Pyrotechnical gas generators are used as pressure accumulators for this purpose. However, a problem arises, in that at the beginning of the activation, i.e. immediately after the ignition of the pyrotechnical gas generator, a steeply rising peak force is developed in accordance with the expansion of the pressure gas which then drops off very rapidly. Thereby, due to the steep force-time characteristic, very large acceleration forces act on the piston, which usually has its entire cross sectional area exposed to the gas pressure, and these large forces act as well as on the tensioning means connected to the drive piston. Consequently the above-mentioned parts are heavily stressed mechanically and, due to the mass inertia, full utilization of the activated motion energy, i.e. conversion into the retightening motion and thereby a high efficiency cannot be obtained. The above-mentioned problems exist, of course, also in drive systems for other purposes in which a very high acceleration of the drive piston is desired.

SUMMARY OF THE INVENTION

An object of the invention is to provide a cylinder/piston drive especially for retightening systems in automatic safety belt winding devices, having a drive piston in a cylinder, as well as a pressure accumulator which can be connected to the interior of the cylinder, and when activated discharges fluid under pressure into the cylinder to move the drive piston therein, whereby an extreme mechanical peak load on the drive piston as well as the parts connected thereto is avoided.

With the foregoing and other objects in view, there is provided in accordance with the invention a cylinder/piston drive especially for retightening systems in automatic safety belt winding devices, comprising a cylinder, a movable drive piston in the cylinder, a pressure accumulator from which fluid under pressure will be released, adapted to be connected to the interior of the cylinder, an opening in the cylinder wall for flow of fluid under pressure from the pressure accumulator through said opening into the interior of the cylinder, a guide part in the cylinder with a protrusion which extends into the piston to initially reduce the cross sectional area of the piston exposed to the fluid under pressure and upon movement of the piston and withdrawal of the piston from the protrusion of the guide part to expose a greater cross sectional area of the piston to the fluid under pressure.

Other features which are considered as characteristic for the invention are set forth in the appended claims.

Although the invention is illustrated and described herein as embodied in a cylinder/piston drive, especially for retightener systems in automatic safety belt winding devices, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
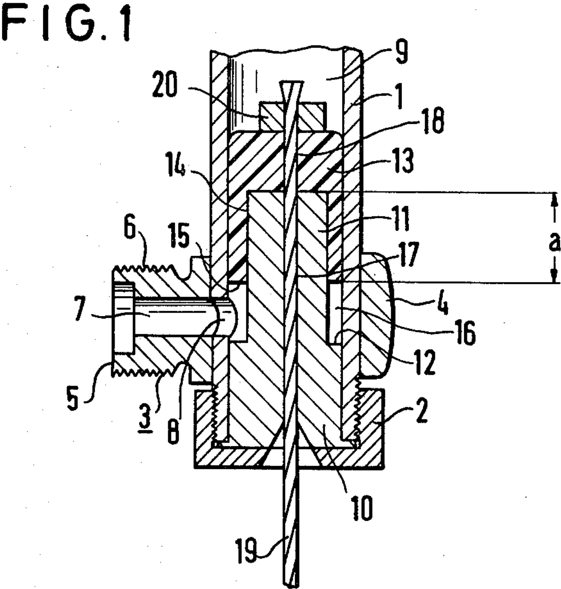
FIG. 1 diagrammatically illustrates a side view in cross section of the cylinder/piston drive according to the invention in which the cylinder is closed off at one end, a guide part with a guide post in the cylinder, a drive piston with a hole section corresponding to the guide post and seated on the guide post, a connecting extension adapted to be fastened to the cylinder for passage of gas under pressure from the cartridge through an opening in the cylinder to exert pressure against a partial cross sectional area of the drive piston.

In accordance with the invention, the drive piston 13 has in the region facing the connecting point of the pressure accumulator (cartridge 45) at least one cross section reducing pressure surface (annular 15; 27) and operates with a guide part (10, 21) in the cylinder 1 adapted to the reduced cross sectional shape in a manner that at the beginning of the pressure action, only part of the piston cross section is exposed to the pressure force.

In this simple manner, the high initial forces which act on the drive piston in conventional systems are reduced. Among the advantages obtained are a simplification and cost reduction of the cylinder system and even a design in light-weight construction may be used. By virtue of the invention, only part of the cylinder surface is stressed at the beginning of the pressure action, and only after travelling through a predetermined travel distance of the piston, is the remaining piston cross section or further partial cross sections exposed to the pressure force, for instance gas pressure, until finally the entire piston cross section is exposed to the gas pressure. In this manner, a more uniform pressure stress is obtained overall at the drive piston and the subsequent parts as seen over the entire stroke of the piston, without impairing the operating capacity of the system.

Advantageous details of the invention are seen from the embodiment examples which are shown in the drawings and will be described in the following.

Figure 2:
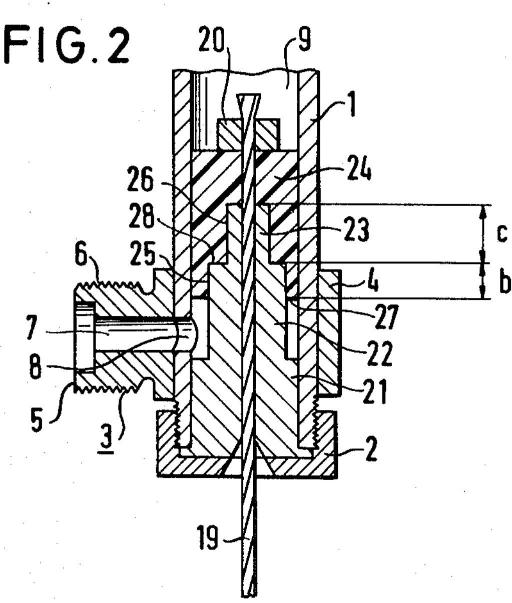
FIG. 2 illustrates a modification of FIG. 1 differing principally in that the guide part has two guide posts following each other, each with a reduced diameter, and the drive piston has two corresponding hole sections.

In FIGS. 1 and 2, cylinder/piston drives are shown with a straight or curved cylinder 1 which is closed off in the Figures at the bottom by a screw cap 2. Toward the top in the Figures, the cylinder 1 may be closed off by a rupture plate of a known type, not shown. Connected to the cylinder 1 is a connecting piece 3 which engages with a fastening means 4 in a manner similar to that of a pipe clamp on the outside circumference of the cylinder 1 and is spaced substantially at right angles to the cylinder axis by means of a connecting extension 5 with a thread 6. In the connecting extension 5 is a connecting line 7 which is designed as a hole and leads into an opening 8 in the cylinder wall. As explained with the aid of the example according to FIGS. 3 and 4, the cylinder 1 is in communication with a pressure accumulator via the above-mentioned connecting piece 3, specifically for connecting extension 5.

In the embodiment example according to FIG. 1, a cylindrical guide part 10 is rigidly supported at the lower end in the interior of the cylinder 9. The guide part 10 has a guide post 11, the diameter of which is reduced and forms a step with an annular area 12 which is located underneath the opening 8 in the cylinder wall. A drive piston 13 has a drill hole section 14 of length a. The inside diameter of the drill hole section 14 corresponds to the outside diameter of the guide post 11. In the rest position, the drive piston 13 sits on the guide post 11 of the guide part 10, and the guide post 11 is emersed into the drill hole section 14 of the drive piston 13. The annular area at the end side of the face of the drive piston 13 ends above the opening 8 and has a cross section which is only part of the total cross sectional area of the piston 13. Between the annular area 15 and the annular area 12 of the cylindrical guide post 10, a cavity 16 is formed which is in communication with the pressure accumulator via the connecting piece 3. The guide part 10 as well as the drive piston 13 have axial holes 17, 18, in which, for instance, a cable-like, flexible pulling means 19 is guided. The latter is connected via a pinched part 20 to the drive piston 13. If fluid under pressure from the pressure accumulator is released, only the reduced cross section or annular area 15 of the drive piston 12 is initially acted upon by the fluid under pressure until the drive piston has travelled the distance a, whereupon the drill hole section 14 is lifted off the guide post 11 and the entire cross section of the piston is exposed to the fluid under pressure.

In the embodiment example according to FIG. 2, the cylinder/piston system has several steps with different cross sections. Here, the guide part 21 has two guide posts 22 and 23 following each other in the axial direction, each with a reduced diameter. Accordingly, the drive piston 24 has two drill hole sections 25, 26 with the lengths b and c which are stepped with respect to the inside diameter. The drive piston 24 is again seated generally flush with its drill hole sections 25 and 26 on the stepped drive posts 22 and 23. If fluid under pressure from a pressure accumulator is released, only a small partial cross section in accordance with the ring surface 27 is acted upon initially by the fluid under pressure. After the distance b has been traversed, a further partial cross section according to the ring surface 28 is added to the above-mentioned partial cross-section, until finally, after traversing the distance c, the entire piston cross section is exposed to the pressure of the fluid. It is, of course, possible to provide even further steps in accordance with the intended application. It is not absolutely necessary that the guide part and the drive piston engage each other in the manner explained. A design of the guide part and the drive piston which varied from the embodiment examples may be employed, provided only a partial cross section, i.e. a reduced cross sectional area no matter of which form, is exposed to the fluid pressure at the beginning of the pressure exposure and a further partial cross section or the entire piston cross section is acted upon by the pressure only after traversing a predetermined distance. As indicated in FIGS. 1 and 2, the screw cap 2 and the hole 17 in the guide part adjacent the screw cap 2 in the Figures are expanded in funnel-fashion downward so that if the course of cable-like pulling means 19 is not in a straight line, the pulling means 19 will be subjected to friction forces as small as possible.

Figure 4:
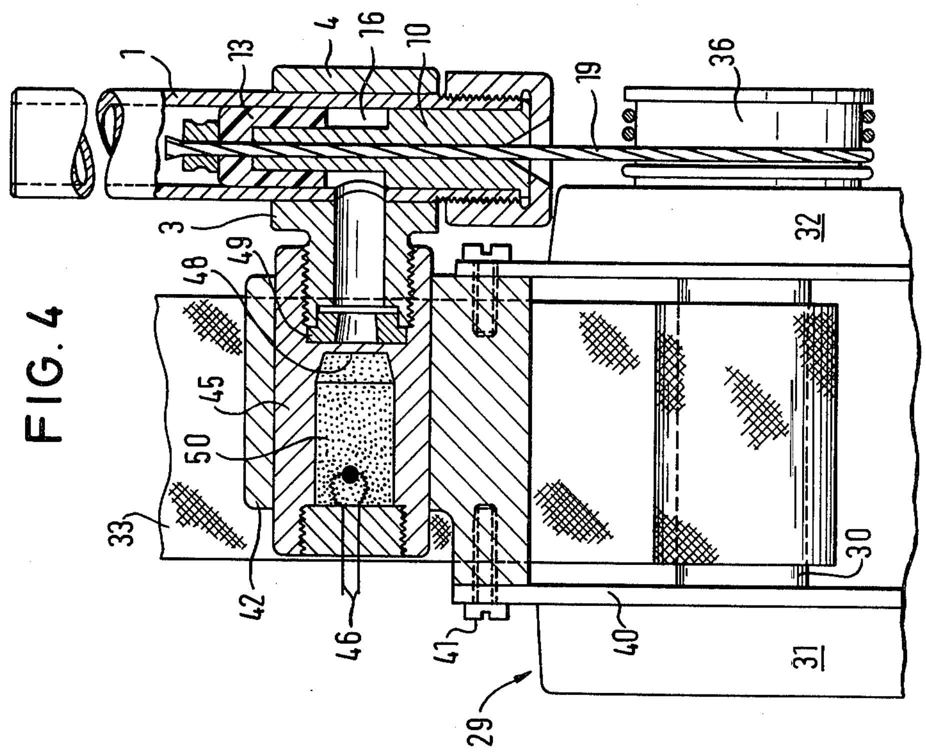
FIG. 4 is an elevation of FIG. 3 with the pressure accumulator and cylinder/piston drive in section to show their relationship in greater detail.
Figure 3:
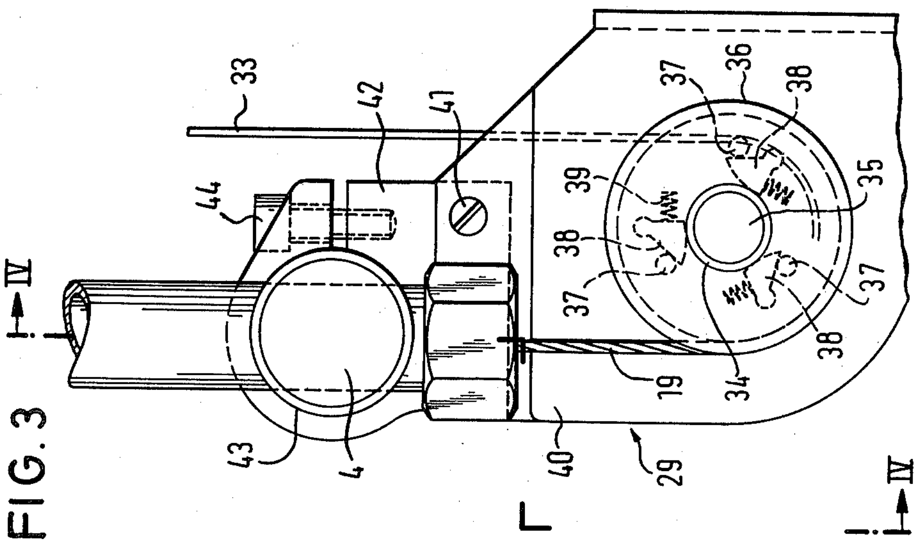
FIG. 3 diagrammatically illustrates, in a side view one cylinder/piston drive according to FIG. 1 in connection with an automatic safety belt winding device.

In the embodiment example according to FIGS. 3 and 4, is an automatic safety belt winding device 29 with a rotatable belt shaft 30, which, on the side as shown in FIG. 4 is in connection with an automatically activated locking device behind a cover 31, and on the other side in also known manner is connected with a rewinding spring in the interior of a cover 32. Wound up on the belt shaft 30 is a flexible belt 33 which is brought to a belt lock, for instance via a deflection fitting, and is fastened to the belt lock. The belt shaft 30 has a shaft extension 35 which extends beyond the cover 32 on the side of the rewinding spring the circumference of which is smooth or slightly roughened. The free end of the tensioning means is fastened and wound to a spool-like pulling means roll 36. The tensioning means roll 36 has a hole 37', the inside diameter of which is larger than the outside diameter of the shaft extension 35, whereby the tensioning means roll 36 can be placed on the cover 32 or on shear pins 37 arranged at the cover 32 and can be locked against rotation. Pivoted at the tensioning means roll 36 are three clamping levers 38 which are pushed by springs 39 against the shear pins 37. In this embodiment example a receiving block 42 is rigidly fastened to the U-shaped housing 40 of the automatic device by means of screws 41. The receiving block 42 has an opening 43 which can be narrowed by clamping screws 44 and which serves for holding a pressure accumulator in the form of a propulsion charge cartridge 45 with fuse 46 as well as for holding the associated cylinder/piston drive according to FIG. 1. The end of the cartridge 45 on the drive side, is closed off by a bursting or rupture plate 48 followed by a nozzle plate 49 which is narrowed in wedge-fashion. The cartridge 45 can be screwed onto the connecting piece 3 of the cylinder/piston arrangement according to FIG. 1. In the event of a crash, the fuse 46 is activated and, thereby, the propulsion charge 50 is ignited automatically, followed by a rupture of the bursting plate 48. The drive piston 13 in FIG. 4 which is connected with the tensioning means 19 is driven via the cavity 16 upward in the manner explained. The tensioning means 19 exerts a torque on the tensioning means roll 36. At the beginning of the rotary motion of the tensioning means roll 36, clamping levers 38 are pushed against the circumferential surface of the shaft extension 35 and are clamped there. On further tension on the tensioning means 36 the shear pins 37 are sheared through, so that the tensioning means roll 36 is free to rotate, whereby the tensioning means roll 36 is coupled to the belt shaft 30 via the clamping levers 38, so that the belt shaft 30 also rotates and causes an instantaneous rewinding of the belt 33 about the body of the vehicle passenger.

Figure 5:
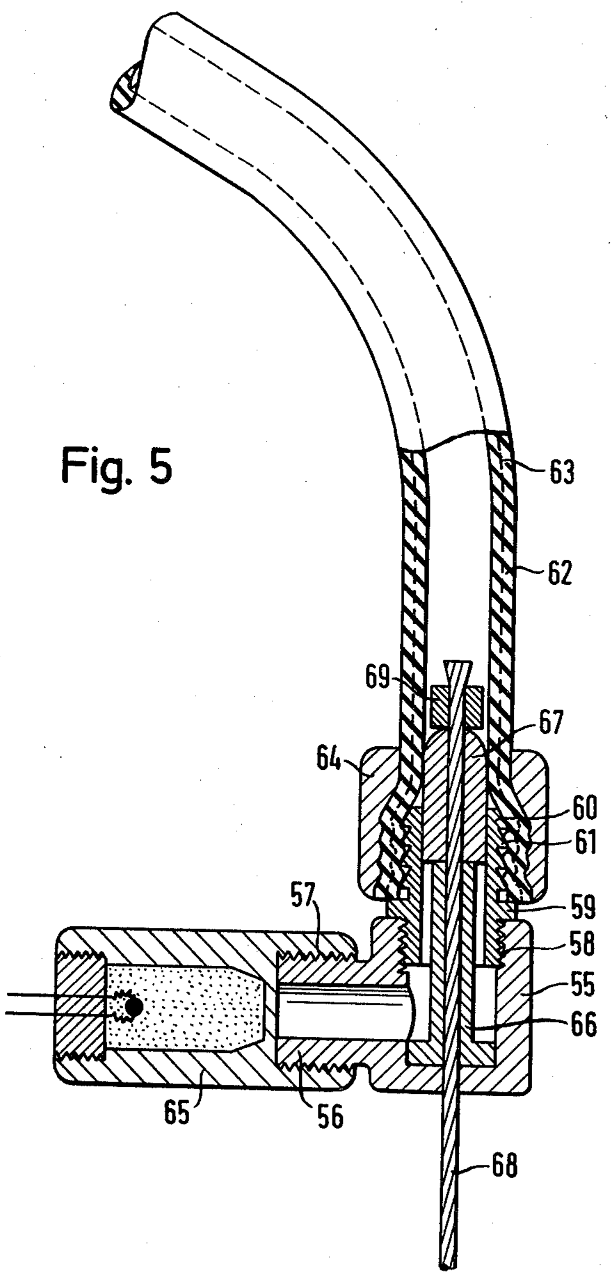
FIG. 5 diagrammatically illustrates a sectional view of the cylinder/piston drive according to the invention in which the lower end of the cylinder has attached a threaded sleeve which latter is surrounded by a flexible section in the form of a high pressure hose to permit bending of the hose in different directions without impairment of the functioning if the drive piston.

In the embodiment example according to FIG. 5, the cylinder/piston drive consists substantially of an L-shaped dimensionally stable, for instance, metallic end part 55 which has on the one hand a connecting piece 56 with a screw thread 57 and on the other hand, concentrically with the cylinder axis, an internal thread 58. A threaded sleeve 59 is screwed to the internal thread 58. Sleeve 59 has a fastening shoulder 60 with a saw-tooth shaped external hose nipple profile 61 surrounded by a flexible cylinder section 62 of a high-pressure hose. This cylinder section 62 consists of elastic, for instance, rubber-like material and has a wire armor 63. One end of section 62 is pushed onto the fastening shoulder 60 and is pressed on by a screw cap 64. A pressure accumulator in the form of a propulsion charged cartridge 65 is fastened to the connecting piece 56 by a screw connection. In the interior of the cylinder, a guide or a support part 66 is arranged for a drive piston 67, the outside diameter of which corresponds to the inside diameter of the hose 62. The guide or support part 66 and the drive piston 67 have through holes for cable-like pulling means 68 which are secured above the drive piston 67 by a pinched or squeezed part 69. The operation of the described drive corresponds to that of FIGS. 1–4; however, the cylinder section 62 can be bent practically in any desired direction without impairment of the driving function to take into consideration the frequently unfavorable and cramped installation conditions in a motor vehicle. This substantially facilitates, in particular, the assembly of the drive in the interior of a hollow column of the motor vehicle body.

I claim:

1. Cylinder/piston drive especially for retightening systems in automatic safety belt winding devices, comprising a cylinder, a movable drive piston in the cylinder, said piston being free of passageways for the flow of fluid therethrough, a pressure accumulator from which fluid under pressure will be released adapted to be connected to the interior of the cylinder, an opening in the cylinder wall for flow of fluid under pressure from the pressure accumulator through said opening into the interior of the cylinder, a guide part in the cylinder formed of a base with a protrusion which extends from the base into the piston to initially reduce the cross sectional area of the piston exposed at an end face to the fluid under pressure and upon movement of the piston and withdrawal of the piston from the protrusion of the guide part to expose a greater cross sectional area of the piston to the fluid under pressure, said protrusion being free of a passageway for the flow of fluid therethrough.

2. Cylinder/piston drive especially for retightening systems in automatic safety belt winding devices, comprising a cylinder, a movable drive piston in the cylinder, a pressure accumulator from which fluid under pressure will be released adapted to be connected to the interior of the cylinder, an opening in the cylinder wall for flow of fluid under pressure from the pressure accumulator through said opening into the interior of the cylinder, a guide part in the cylinder, with a protrusion which extends into the piston to initially reduce the cross sectional area of the piston exposed to the fluid under pressure and upon movement of the piston and withdrawal of the piston from the protrusion of the guide part to expose a greater cross sectional area of the piston to the fluid under pressure, wherein the drive piston has a plurality of piston hole sections which follow each other in the axial direction and are of increasing diameter in the direction toward the opening in the cylinder wall, and wherein the guide part has corresponding guide protrusions to said hole sections, and where in the rest position the drive piston is seated on the protrusions extending into the piston hole sections.

3. Cylinder/piston drive according to claim 1, wherein the cylindrical guide part is fastened in the cylinder, and wherein the protrusion is at least one axial guide post with reduced diameter, which is emersed in the rest position in at least one hole section of the drive piston.

4. Cylinder/piston drive according to claim 3, wherein in said rest position said base has an annular surface on the base encircling said guide post with the reduced diameter, wherein the drive piston has an annular surface on its end face, and wherein said two annular surfaces are spaced to provide an annular cavity for said opening in the cylinder wall into which a connecting line of the pressure accumulator opens.

5. Cylinder/piston drive according to claim 3 or claim 4, wherein the guide part and the drive piston have axial holes in which a tensioning means connected to the drive piston is guided.

* * * * *